United States Patent
Sashida et al.

(10) Patent No.: US 8,884,897 B2
(45) Date of Patent: Nov. 11, 2014

(54) TOUCH PANEL DEVICE AND ELECTRONIC DEVICE WITH IMPROVED HAPTIC FEEDBACK

(75) Inventors: Norikazu Sashida, Tokyo (JP); Shigeo Ishii, Tokyo (JP); Yoshiyuki Watanabe, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 137 days.

(21) Appl. No.: 13/431,619

(22) Filed: Mar. 27, 2012

(65) Prior Publication Data

US 2012/0249459 A1  Oct. 4, 2012

(30) Foreign Application Priority Data

Mar. 28, 2011 (JP) ................ 2011-071250

(51) Int. Cl.
```
G06F 3/041    (2006.01)
G06F 3/042    (2006.01)
G06F 3/043    (2006.01)
G06F 3/045    (2006.01)
G06F 3/01     (2006.01)
```
(52) U.S. Cl.
CPC .............. G06F 3/041 (2013.01); G06F 3/016 (2013.01)
USPC ........... 345/173; 345/174; 345/175; 345/177; 178/18.04

(58) Field of Classification Search
CPC ....... G06F 3/016; G06F 3/041; G06F 3/0412; G06F 3/0414; G06F 2203/04105; H03H 9/1035
USPC ........... 345/156–183, 207; 178/18.01–20.04; 361/679.21; 310/313, 348, 353, 338; 340/407.2; 257/415; 331/158; 428/156; 368/47

See application file for complete search history.

(56) References Cited

U.S. PATENT DOCUMENTS

| | | | | |
|---|---|---|---|---|
| 6,087,198 | A * | 7/2000 | Panasik | 438/51 |
| 6,205,226 | B1 * | 3/2001 | Senoo et al. | 381/190 |
| 7,184,027 | B2 * | 2/2007 | Sato et al. | 345/173 |
| 7,199,788 | B2 * | 4/2007 | Ise et al. | 345/173 |
| 7,242,395 | B2 * | 7/2007 | Kurashima et al. | 345/173 |
| 7,439,824 | B2 * | 10/2008 | Aigner et al. | 333/187 |
| 8,467,177 | B2 * | 6/2013 | Mathew et al. | 361/679.21 |

(Continued)

FOREIGN PATENT DOCUMENTS

| | | |
|---|---|---|
| EP | 2 202 619 A1 | 6/2010 |
| EP | 2 202 620 A1 | 6/2010 |

(Continued)

*Primary Examiner* — Dwayne Bost
*Assistant Examiner* — Darlene M Ritchie
(74) *Attorney, Agent, or Firm* — Chen Yoshimura LLP

(57) ABSTRACT

A touch panel device, includes a transparent protective substrate disposed on a front side of the touch panel, the protective substrate being configured by joining a first glass substrate residing on a front side and a second glass substrate residing on a touch panel side, wherein either one of the first and second glass substrates is configured to have one or more stepped portions formed either on a rear surface of the first glass substrate or a front surface of the second glass substrate, the rear surface of the first glass substrate and the front surface of the second glass substrate facing one another; and one or more piezo vibration elements each disposed within one of the stepped portions so as to be acoustically coupled with the first glass substrate, wherein each of said one or more stepped portions is configured thicker than the corresponding piezo vibration element.

10 Claims, 4 Drawing Sheets

(56) References Cited

U.S. PATENT DOCUMENTS

| | | | |
|---|---|---|---|
| 8,576,186 B2 * | 11/2013 | Imai et al. | 345/173 |
| 8,717,314 B2 * | 5/2014 | Imai et al. | 345/173 |
| 2004/0232802 A1 * | 11/2004 | Koshido | 310/348 |
| 2005/0035685 A1 * | 2/2005 | Tanaka et al. | 310/313 D |
| 2006/0097996 A1 * | 5/2006 | Tabata | 345/173 |
| 2006/0109254 A1 | 5/2006 | Akieda et al. | |
| 2008/0315717 A1 * | 12/2008 | Schroder et al. | 310/311 |
| 2009/0267902 A1 * | 10/2009 | Nambu et al. | 345/173 |
| 2009/0284485 A1 * | 11/2009 | Colgate et al. | 345/173 |
| 2010/0141580 A1 * | 6/2010 | Oh | 345/158 |
| 2010/0231550 A1 * | 9/2010 | Cruz-Hernandez et al. | 345/174 |
| 2010/0253648 A1 * | 10/2010 | St. Pierre | 345/174 |
| 2010/0277439 A1 * | 11/2010 | Charlier et al. | 345/174 |
| 2010/0295807 A1 * | 11/2010 | Xie et al. | 345/173 |
| 2010/0309142 A1 | 12/2010 | Cruz-Hernandez et al. | |
| 2010/0321330 A1 * | 12/2010 | Lim et al. | 345/174 |
| 2011/0050406 A1 * | 3/2011 | Hennig et al. | 340/407.2 |
| 2011/0050604 A1 * | 3/2011 | Kwon et al. | 345/173 |
| 2011/0096013 A1 * | 4/2011 | Krumpelman et al. | 345/173 |
| 2011/0102342 A1 * | 5/2011 | Iwawaki et al. | 345/173 |
| 2011/0148795 A1 * | 6/2011 | Aono et al. | 345/173 |
| 2011/0242055 A1 * | 10/2011 | Kim et al. | 345/175 |
| 2011/0248788 A1 * | 10/2011 | Fujihira et al. | 331/158 |
| 2011/0260585 A1 * | 10/2011 | Ichikawa et al. | 310/344 |
| 2011/0261021 A1 * | 10/2011 | Modarres et al. | 345/177 |
| 2011/0304569 A1 | 12/2011 | Kai et al. | |
| 2012/0075221 A1 * | 3/2012 | Yasuda | 345/173 |
| 2012/0105333 A1 * | 5/2012 | Maschmeyer et al. | 345/173 |
| 2012/0105400 A1 * | 5/2012 | Mathew et al. | 345/207 |
| 2012/0113031 A1 * | 5/2012 | Lee et al. | 345/173 |
| 2012/0223543 A1 * | 9/2012 | Snider et al. | 296/146.16 |
| 2012/0249459 A1 * | 10/2012 | Sashida et al. | 345/173 |

FOREIGN PATENT DOCUMENTS

| | | |
|---|---|---|
| EP | 2 202 621 A1 | 6/2010 |
| EP | 2 207 080 A1 | 7/2010 |
| JP | 2006-146611 A | 6/2006 |
| JP | 2010-152889 A | 7/2010 |
| JP | 2010-157037 A | 7/2010 |
| JP | 2010-287231 A | 12/2010 |
| JP | 2011-2926 A | 1/2011 |

* cited by examiner

TOUCH PANEL DEVICE AND ELECTRONIC DEVICE WITH IMPROVED HAPTIC FEEDBACK

This application is based upon and claims the benefit of priority from prior Japanese Patent Application 2011-071250 filed on Mar. 28, 2011 titled "touch panel device and electronic device," the entire contents of which are incorporated herein by reference.

TECHNICAL FIELD

The present disclosure relates to a touch panel device, and more particularly to a touch panel device with a force feedback function (or haptic function) using a piezo vibration element. The present disclosure also relates to an electronic device having such a touch panel device.

BACKGROUND ART

Electronic devices such as mobile phones use a touch sensitive switch. Such a touch sensitive switch may comprise a display panel such as liquid crystal panel and a pressure sensitive or capacitance type input device. Such touch sensitive switches tend to have a shorter stroke than ordinary mechanical switches. Users sometimes cannot perceive such a short stroke. Hence, developments have been made to provide touch panel devices that can produce vibration or other mechanical movements in concert with a push-down operation by a user so that the user can recognize that their push-down operation was actually made.

Haptic feedback can be generated by various conventional driving sources including a piezoelectric actuator, as described in Japanese Patent Application Publication No. 2010-157037, and an electromagnetic actuator, as described in Japanese Patent Application Publication No. 2006-146611. These actuators are disposed on non-displaying areas of a display panel so as to provide vibration without preventing a user from viewing displayed images on the display panel. Haptic feedbacks can also be provided by other conventional configurations, such as a structure configured by stacking a liquid crystal panel, touch panel, and haptic panel, as described in Japanese Patent Application Publication No. 2011-2926. A haptic actuator can be disposed beneath a liquid crystal panel, as described in Japanese Patent Application Publication No. 2010-152889.

In such conventional haptic feedback devices, in response to a user's pressure contact with a touch panel, an actuator is configured to deform such that the deformation can be conveyed from the touch panel to the user's finger so as to provide the user with a sense that the user made sufficient contact with the touch panel. An input signal to such an actuator can be a simple sinusoidal signal or square wave signal. A special signal such as a kick-in pulse or braking pulse also can be used as an input signal, as described in Japanese Patent Application Publication No. 2010-287231. An actuator signal is also input to an actuator to cause the entire panel to vibrate and operate as a speaker for reproducing a recorded sound of music or voice.

However, in those conventional haptic mechanisms described in the above references, a haptic actuator is disposed on the bottom or rear surface of a heavy liquid crystal panel or touch panel. This arrangement requires an actuator to generate a large actuator force and displacement in order to provide sufficient haptic effects. To achieve such a large actuator force and displacement, a high voltage input needs to be applied. Such a high voltage is difficult to use in electronic devices such as mobile phones. Moreover, an actuator is needed separately from the liquid crystal panel and touch panel. Therefore, the resulting display devices become thicker and cannot be made thin.

SUMMARY OF THE INVENTION

The present disclosure provides a low-profile touch panel device and electronic device for providing enhanced haptic effects by effectively transmitting vibration generated by an actuator with relatively small force output and small displacement to the front surface of the touch panel device.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a touch panel device including a touch panel; a display unit disposed on a rear side of the touch panel; a transparent protective substrate disposed on a front side of the touch panel, the protective substrate being configured by joining a first glass substrate residing on a front side and a second glass substrate residing on a touch panel side, wherein either one of the first and second glass substrates is configured to have one or more stepped portions formed either on a rear surface of the first glass substrate or a front surface of the second glass substrate, the rear surface of the first glass substrate and the front surface of the second glass substrate facing one another; and one or more piezo vibration elements each disposed within one of the stepped portions so as to be acoustically coupled with the first glass substrate, wherein each of said one or more stepped portions is configured thicker than the corresponding piezo vibration element.

In one aspect, at least one of the stepped portions is formed on the second glass substrate. In another aspect, at least one of the stepped portions is formed as a through-hole. In yet another aspect, one or more buffers are disposed between one of the piezo vibration elements and the touch panel. In further still another aspect, the first glass substrate is configured thinner than the second glass substrate. In another aspect, the at least one of the stepped portions is formed to have a tapered wall configured such that a cross section of said at least one of the stepped portions becomes wider as approaching the first glass substrate. In another aspect, at least one of the piezo vibration elements includes a plurality of piezoelectric layers and a plurality of electrode layers laminated in an alternate manner. In another aspect, at least one of the piezo vibration elements has a bimorph structure. In yet another aspect, each of vibrations generated by the piezo vibration elements is conveyed to the first glass substrate in a form of a surface elastic wave.

In one aspect, an electronic device according to the present disclosure comprises one of the above-described touch panel devices. In addition to the illustrative aspects, embodiments, and features described above, further aspects, embodiments, and features will become apparent by reference to the drawings and the following detailed description.

According to the present disclosure, a transparent protective substrate for protecting a display unit and touch panel is configured by joining the first and second glass substrates, wherein either the first or second glass substrate is formed to have one or more stepped portions on their joined surface side thickness so as to be thicker than the piezo vibration element. The first and second glass substrates are joined such that the piezo vibration element is embedded within the stepped portion. Thus, even a small vibration or displacement generated by the piezo vibration element may be transmitted to the protective substrate front surface in such a manner as to sufficiently provide haptic effects to a user.

It is to be understood that both the foregoing general description and the following detailed description are exemplary and explanatory, and are intended to provide further explanation of the invention as claimed.

BRIEF DESCRIPTION OF THE DRAWING

FIG. 1(A) shows a perspective view of the electronic device; and FIG. 1(B) shows an exploded perspective view of a panel display unit of the electronic device.

DETAILED DESCRIPTION OF THE PREFERRED EMBODIMENTS

Embodiments of the present disclosure will be described below.

Figure 1:
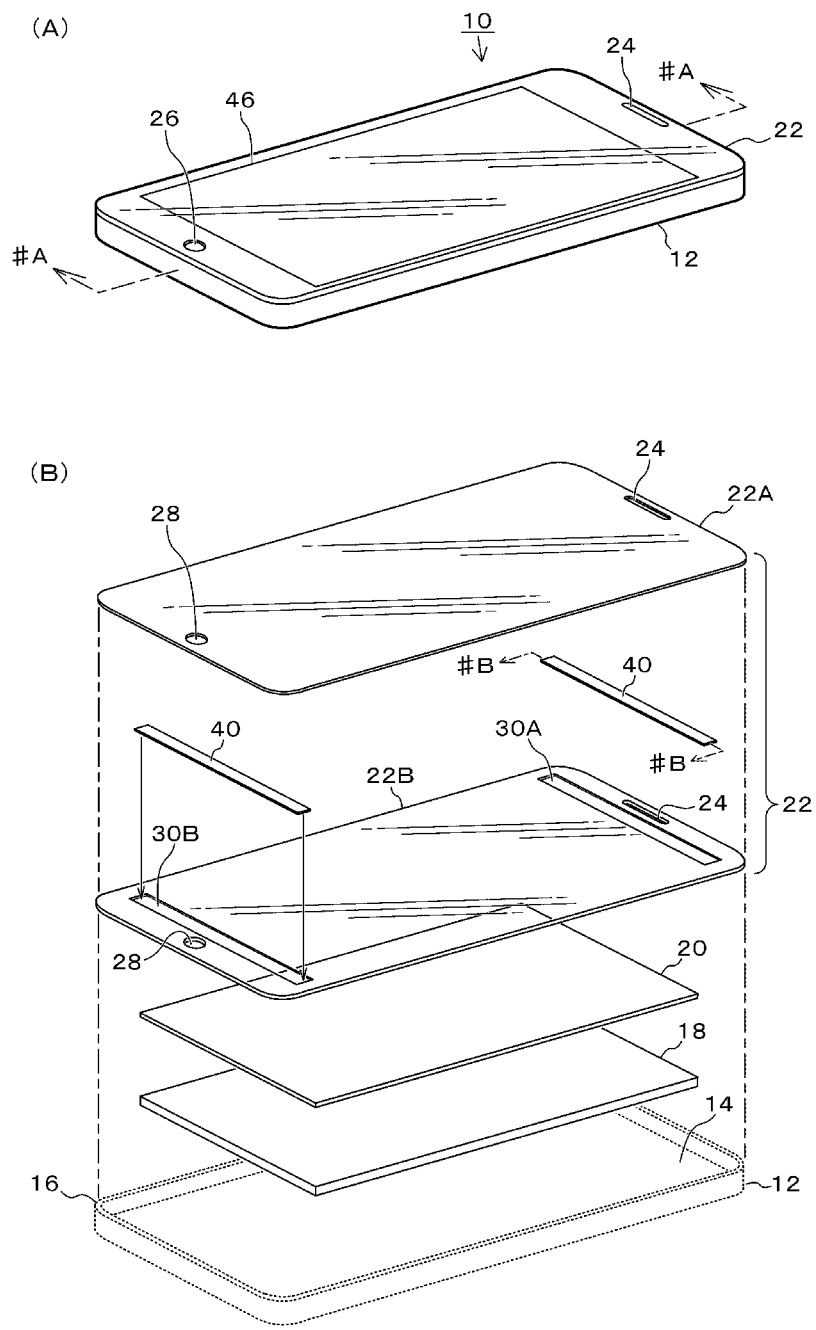
FIG. 1 shows an electronic device in accordance with one embodiment of the present disclosure, and more particularly.
Figure 2:
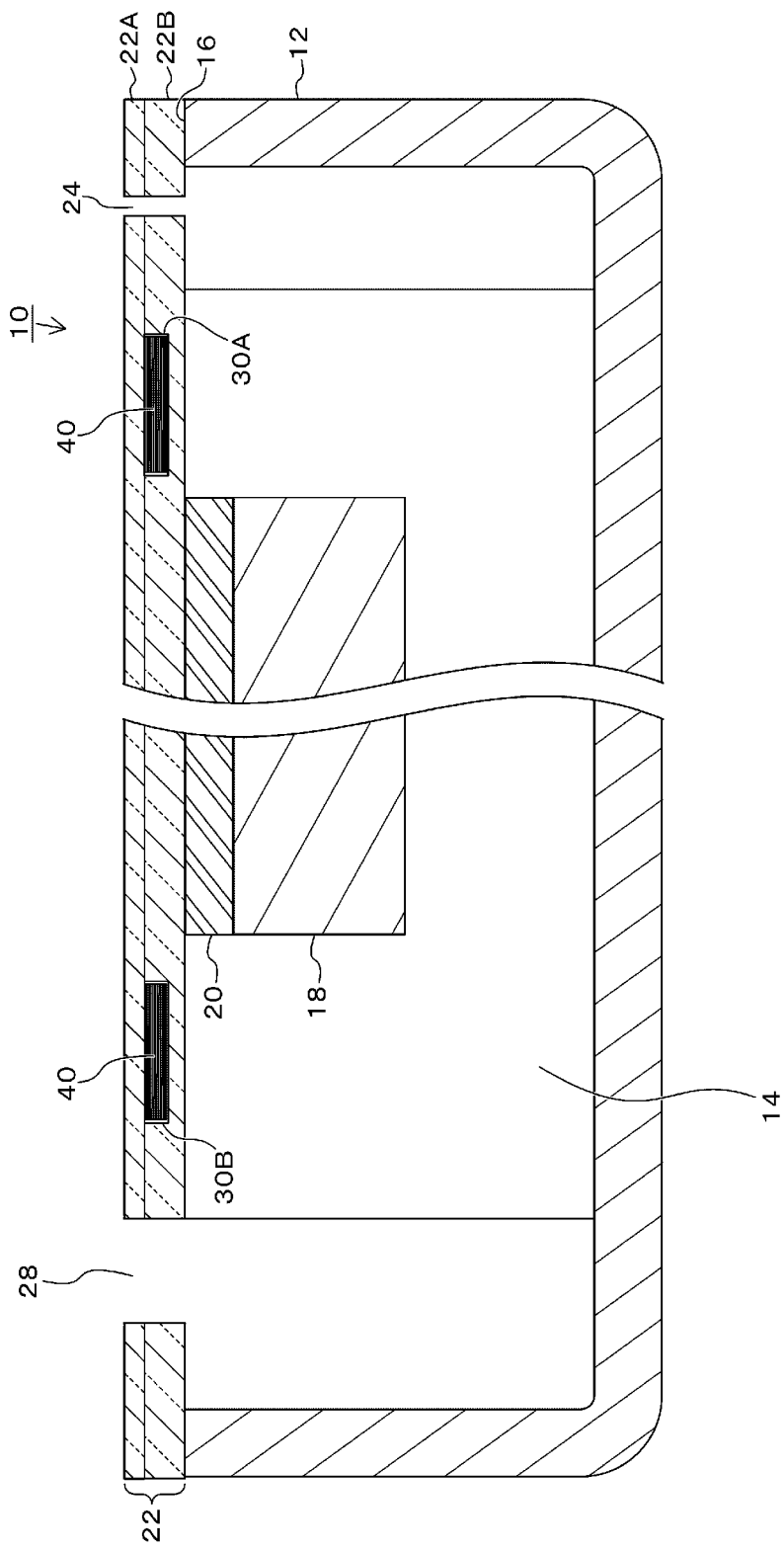
FIG. 2 shows a cross section of a piezo vibration element mounting portion viewed from arrow #A in FIG. 1(A).
Figure 3:
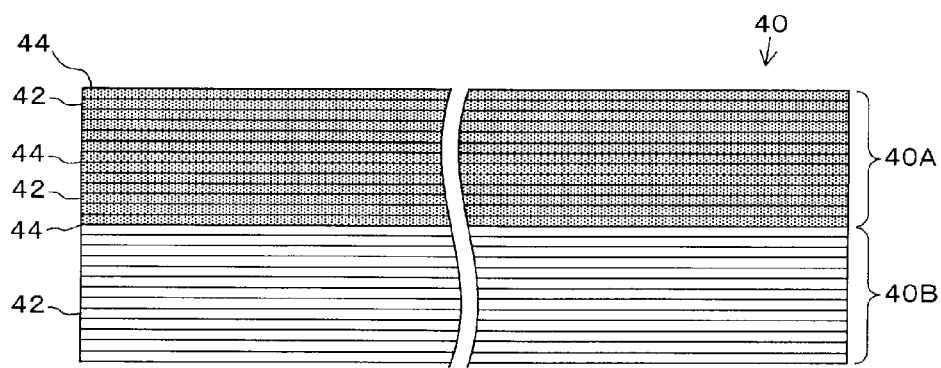
FIG. 3 shows a cross section of a piezo vibration element viewed from arrow #B in FIG. 1(B).

With reference to FIGS. 1-3, one embodiment of the present disclosure will be described. The present disclosure relates to technologies for providing haptic effects for various electronic devices that include a display unit and touch panel device associated therewith. Those electronic devices include mobile phones, smartphones, car navigation devices and game consoles, but those devices are not limiting. Such haptic effects are provided to a user for sensory perception during input operation. FIG. 1 shows a smartphone as an example of an electronic device in accordance with one aspect of the present disclosure.

As shown in FIGS. 1 and 2, smartphone 10 in accordance with one embodiment includes a display unit 18 and a touch panel 20 housed within a storage portion 14 of a housing 12. The almost entire front surface of the smartphone 10 is covered by a transparent protective panel 22 (protective substrate). The protective panel 22 is supported by an edge 16 of the housing 12. The term "transparent" is intended to describe the fact that images displayed on the display unit are visible to a user through the protective substrate although the display unit is disposed rear of the protective substrate. The protective panel 22 is provided with an opening 24 for a receiver and an opening 28 for an operation switch 26. A display area 46 on which images are displayed exists in a specific area around the center of the protective panel 22. The protective panel 22 is a joined substrate configured by joining a first glass substrate 22A disposed on the front surface side and a second glass substrate 22B disposed on the touch panel 20 side. The first and second glass substrates 22A and 22B may be made of chemically reinforced glass. For ease of describing various embodiments, the term "front" (or "upper") and "rear" (or "lower") is used herein from the point of view of a user viewing displayed images.

The touch panel 20 is disposed on the lower side (or rear side) of the protective panel 22. The touch panel 20 may be any type of known touch panel device including a capacitance type touch panel and a resistive touch display. The display unit 18 is disposed beneath the touch panel 20. The display unit 18 may be a liquid crystal display device, an organic EL, or any type of known display devices. The protective panel 22 is fixed to the touch panel 20 via, for example, an optically transparent glue (not shown) or adhesive tape (not shown). The touch panel 20 is also fixed to the display unit 18 in the same manner. The glue may include epoxy or any other ordinary bonding material. The adhesive material may include acrylic adhesive or any other ordinary adhesive materials.

The illustrated protective panel 22 is provided with a pair of piezo vibration elements 40. In the illustrated embodiment, the lower glass substrate 22B is provided with a pair of stepped portions 30A and 30B (also referred to as recesses 30A and 30B), each accommodating one of the piezo vibration elements 40. Although the illustrated touch panel device has a pair of piezo vibration elements 40, the number of piezo vibration elements 40 is not limited, but any number of piezo vibration elements 40 may be used depending on a particular configuration of an electronic device on which the touch panel device is mounted. For example, a single piezo vibration element 40 or three piezo vibration elements 40 may be mounted on a touch panel device. The recesses 30A and 30B may be formed on the glass substrate 22B on its front surface side. The height of the stepped portions 30A and 30B (recesses 30A and 30B in the illustrated embodiment) may be configured to be greater than the thickness of the piezo vibration elements 40. The thickness of the piezo vibration element 40 refers to the sum of at least the thickness of the piezo vibration element 40 without deformation and the amount of the possible displacement of the piezo vibration element 40. The upper surface of each of the piezo vibration elements 40 is attached to the upper glass substrate 22A via a glue, adhesive, or double-faced tape; and the lower surface of the piezo vibration elements 40 is supported on the bottom surfaces of the recesses 30A and 30B. As shown in the illustrated embodiment, each of the piezo vibration elements 40 is formed rectangular in plan view. The piezo vibration elements 40 may be mounted on the recesses 30A and 30B in the manner that the both lateral ends thereof are stiffly fixed and the mid portions thereof are flexibly fixed to the corresponding recesses 30A and 30B, thereby efficiently conveying the generated vibrations to the glass substrate 22. Preferably, the peripheral portions (or both ends) of the piezo vibration elements 40 are attached to the corresponding recesses 30A and 30B using a rigid glue such as epoxy or double-faced tape whose substrate is made of PET, while the mid portions are preferably attached via a flexible glue such as urethane or silicon or flexible double-faced tape whose substrate is made of rubber or elastomer. The dimensions of the recesses 30A and 30B may be determined in accordance with the dimensions of the piezo vibration elements 40.

The thickness of the protective panel 22 including the glass substrates 22A and 22B may vary depending on particular arrangements of electronic devices on which the protective panel 22 is mounted, but is preferably less than 1 mm. In the illustrated embodiment, the upper glass substrate 22A is formed thinner than the lower glass substrate 22B so as to effectively convey the vibrations generated with a smaller actuator force. As shown in FIG. 2, each of the piezo vibration elements 40 is disposed such that it does not face the touch panel 20 in plan view, thereby preventing the touch panel 20 from interrupting the vibration of the piezo vibration elements 40.

Next, with reference to FIG. 3, the piezo vibration elements 40 will be described in further detail. As shown in FIG. 3, the piezo vibration element 40 is configured by alternately stacking a plurality of piezoelectric layers 42 and electrode layers 44. The piezo vibration elements 40 in the illustrated embodiment may be a bimorph piezoelectric vibrator wherein the upper portion 40A and the lower portion 40B have different polarization directions therebetween. Alternatively, the piezo vibration element 40 may alternatively have either a single plate structure or a unimorph structure. If the piezo vibration element 40 is a unimorph type element, all the piezoelectric layers forming the element 40 are polarized in the same direction depending on a particular arrangement of the electronic device on which the piezo vibration element 40 is mounted. The laminated structure is preferable because it can operate with a lower voltage input. In addition, the bimorph structure is preferable if larger displacement or actuator force is desired. The piezoelectric layers 42 may be made of various piezoelectric ceramics known to a person skilled in the art such as lead zirconate titanate with appropriate additives. The electrode layers 44 may be made of various electrode materials including silver or platinum. Those materials for the piezoelectric layers 42 and electrode layers 44 are not limiting, but any suitable materials may be used.

Each of the piezo vibration elements 40 is embedded within the glass substrate 22B. Each of the piezo vibration elements 40 is preferably configured thick enough to convey the generated displacement or actuator force and to function as the protective panel. Accordingly, the thickness of each of the piezo vibration elements 40 may be in the range of 0.4 mm-0.6 mm in one embodiment. The suitable width and length of the piezo vibration elements 40 may depend on the electronic device on which the element 40 is mounted. In the case of the illustrated smartphone 10, the dimensions preferably are the length of 60 mm or less and the width of 5 mm or less. The width of more than 2 mm is more preferable so as to sufficiently convey the generated vibration to the glass surface. In the illustrated embodiment, the piezo vibration elements 40 may be configured to have the thickness of 0.5 mm, the length of 50 mm, and the width of 3 mm. The thickness of each of the illustrated piezoelectric layers 42 may be 18 µm and the piezo vibration elements 40 may have 26 layers of the piezoelectric layer 42. The number of laminated piezoelectric layers 42 is not limited, and any number of piezoelectric layers 42 may be used to form the piezo vibration element 40.

One of the electrode layers 44 may be formed on the front surface of each of the piezo vibration elements 40 and connected to a driving circuit (not shown). Conducting paths for connecting the electrode layer 44 with the driving circuit may be formed on the front surface of the glass substrates 22A and/or 22B by printing or sputtering, for example. The conducting path may also be formed of ultrafine metal lines. A touch panel device (or a panel display unit thereof) for providing haptic effects in accordance with the present disclosure may be fabricated by laminating the above display unit 18, the touch panel 20, and the protective panel 22 having the piezo vibration elements 40.

In operation, in response to a pressure contact by a user with the protective panel 22 at an area corresponding to an image displayed on the display area 46, it is detected that the touch panel 20 is pressed down. Upon detection of the press-down operation, a signal is supplied to one or more of the piezo vibration elements 40 for activation. Since the glass surrounding (or the glass on the lateral sides of) the piezo vibration elements 40 is thicker and more rigid than the glass on the upper side (i.e., the glass substrate 22A) of the same, each of the vibrations generated by the piezo vibration elements 40 in the recesses 30A and 30B of the glass substrate 22B is transmitted in the form of a surface elastic wave and is conveyed to the finger or the pen tip of a stylus that pressed the protective panel 22. Thus, enhanced perception that a switch was sufficiently pressed can be conveyed to a user with a smaller actuator force as compared to a conventional arrangement in which a generated vibration is conveyed through the entire thickness of the glass substrate (protective panel 22).

The signal input to each of the piezo vibration elements 40 may be a simple sinusoidal signal, square wave signal or combination thereof. The signal may also be any signal disclosed in Japanese Patent Application Publication No. 2010-287231, which is incorporated in its entirety herein by reference, such as a kick-in pulse or braking pulse. In the illustrated embodiments, the amplitude or phase of each of the input signals to the pair of piezo vibration elements 40 may be controlled such that a strong vibration can be generated in a particular area in the protective panel 22. The signal may also be controlled so as to selectively vibrate an area contacted by a user's finger.

The amount of displacement of the protective panel 22 of the touch panel device in accordance with one embodiment (panel display unit) was measured using a 200 Hz, 8 Vrms input signal. A human's finger is the most sensitive to a 200 Hz vibration. In addition, an acoustic pressure of the sound generated by the same touch panel device was measured via a microphone disposed 10 cm away from the front surface of the protective panel 22 using a 100 Hz sinusoidal input signal. The measured amount of displacement was 4 µm and the measured acoustic pressure was 90 dB. Another touch panel device was prepared as a comparative example. The comparative touch panel device was provided with a pair of piezo vibration elements that are disposed beneath a display device. The amount of displacement and acoustic pressure of the sound generated by the comparative touch panel device was measured. The measured displacement for the comparative touch panel device was 0.3 µm and the measured acoustic pressure was 70 dB. Thus, it was found that the amount of displacement and the acoustic pressure generated by the touch panel device in accordance with one embodiment of the present disclosure were significantly improved.

Figure 4:
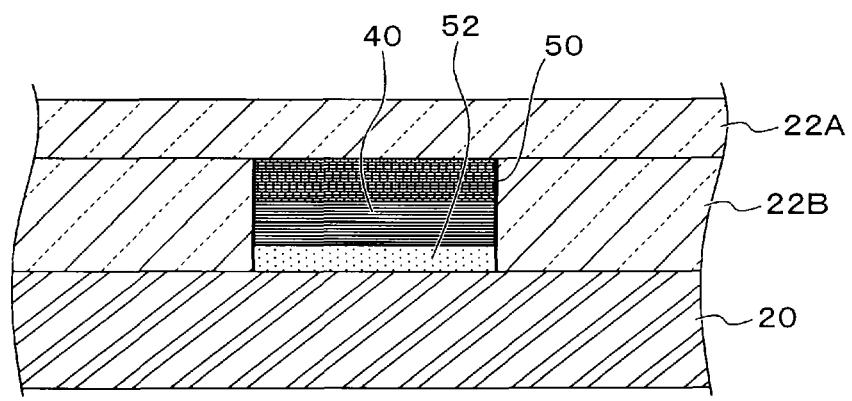
FIG. 4 shows another embodiment of the present disclosure.
Figure 4:
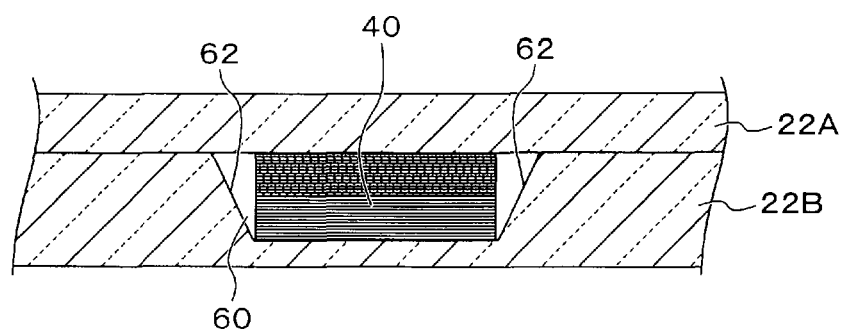

Now, with reference to FIG. 4, other embodiments of the present disclosure will be described. FIG. 4(A) shows an alternative embodiment, which is similar to the embodiment shown in FIGS. 1-3 except that a through-hole 50 is formed on the glass substrate 22B and buffer 52 is disposed between the embedded piezo vibration element 40 and the touch panel 20. Thus, the embedded piezo vibration element 40 is supported by the touch panel 20 via the buffer 52. The buffer 52 may have a modulus of elasticity of 10-100 MPa. The buffer 52 may prevent the touch panel 20 from interrupting the transmission of the vibration from the piezo vibration element 40 to the protective panel 22.

FIG. 4(B) shows an alternative embodiment, which is similar to the embodiment shown in FIGS. 1-3 except that the glass substrate 22B has recess(es) (or stepped portion) 60 having a pair of tapered walls 62 extending upwardly at an angle of approximately 20° with respect to the vertical, instead of the recesses 30A and 30B. The piezo vibration element 40 may be mounted within the recess 60. The tapered shape of the recess 60 may enhance efficiency of vibration transmission.

The above-described touch panel device in accordance with various embodiments provides the following advantageous effects:

(1) In one embodiment, the transparent protective panel 22 for protecting the display unit 18 and touch panel 20 is configured by joining two glass substrates 22A and 22B; and the recesses 30A and 30B (or through-hole 50 or recess 60) are formed in the glass substrate 22B disposed on the touch panel 20 side from the surface facing the glass substrate 22A such that the depth of each of the recesses 30A and 30B is greater than the thickness of the corresponding piezo vibration element 40, wherein the piezo vibration elements 40 are disposed within the recesses 30A and 30B (or through-hole 50 or recess 60) and joined with the glass substrate 22A. Accordingly, each of the vibrations generated by the piezo vibration elements 40 may be transmitted as a surface elastic wave to the front surface of the protective panel 22, thereby vibrating the front surface of the protective panel 22 sufficiently to convey an enhanced sensory perception to a user's finger even with a small displacement and actuator force. Thus, the touch panel device according to the present disclosure may provide sufficient haptic effects while maintaining a low-profile configuration.

(2) Because the bottom surface of the recesses 30A and 30B formed on the glass substrate 22B supports the piezo vibration elements 40, the piezo vibration element 40 can be disposed without overlapping the touch panel 20. This way, the touch panel 20 does not inhibit the vibration generated by the piezo vibration elements 40. (3) The glass substrate 22A residing on the front surface side is formed thinner than the glass substrate 22B residing on the touch panel side, thereby efficiently conveying the vibration generated by each of the piezo vibration elements 40 with a smaller actuator force. (4) The touch panel device according to one embodiment is provided with two separate piezo vibration elements 40 that can be controlled by separate input signals each having different amplitudes and phases from one another. Those separate signals may control corresponding piezo vibration elements 40 respectively and independently so as to selectively vibrate an area contacted by a user's finger by, for example, generating a stronger vibration at a particular position.

(5) The piezo vibration element 40 may be formed rectangular in plan view and mounted on the recesses 30A and 30B (or through-hole 50 or recess 60) stiffly at the both ends thereof while flexibly at the mid portions thereof, thereby efficiently conveying the generated vibrations to the glass substrate 22. (6) In one embodiment, the piezo vibration element 40 is configured by alternately laminating a plurality of piezoelectric layers 42 and a plurality of electrode layers 44 so that it can operate with a lower input voltage. (7) In one embodiment, the piezo vibration element 40 is configured to have a bimorph structure which may generate larger displacement or actuator force.

The foregoing illustrated embodiments have been provided solely to illustrate the structural and functional principles of the present invention, and should not be regarded as limiting. To the contrary, the present invention is intended to encompass all modifications, substitutions, and alterations within the spirit and scope of the following claims. For example, the sizes and shapes of various components of the touch panel devices in accordance with various embodiments may vary. As noted above, the piezo vibration element 40 may be formed rectangular but the particular shapes and sizes described above are not limiting. Rather, the piezo vibration element 40 may be configured to have any length, width, and thickness within the spirit and scope of the present invention. For example, the piezo vibration element 40 may be formed annular.

According to the above-described embodiments of the present disclosure, a transparent protective substrate for protecting a display unit and touch panel is configured by joining first and second glass substrates, wherein either the first or second glass substrate is formed to have one or more stepped portions on their facing surfaces such that the stepped portions may be formed thicker than the corresponding piezo vibration element. The first and second glass substrates are joined while maintaining each of the piezo vibration elements within the corresponding stepped portion. Thus, even a small vibration or displacement may be transmitted to the front surface of the protective substrate in such a manner as to sufficiently provide haptic effects to a user via the protective substrate. As such, various embodiments of the present disclosure may be applied to various touch panel devices or electronic devices having the same. The touch panel devices may be implemented in various low-profile devices for enhanced haptic effects.

What is claimed is:

1. A touch panel device, comprising:
   a touch panel;
   a display unit disposed on a rear side of the touch panel so that the touch panel is above the display unit as seen from a side of a user;
   a transparent protective substrate disposed on a front side of the touch panel so that the transparent protective substrate is above the touch panel as seen from the side of the user, the protective substrate being configured by joining a first glass substrate residing on a front side and a second glass substrate residing on a touch panel side, wherein either one of the first and second glass substrates is configured to have one or more stepped portions formed either on a rear surface of the first glass substrate or a front surface of the second glass substrate, the rear surface of the first glass substrate and the front surface of the second glass substrate fixed side by side facing one another so that said one or more stepped portions are embedded in the transparent protective substrate;
   one or more piezo vibration elements each disposed within one of the stepped portions in the transparent protective substrate so as to be acoustically coupled with the first glass substrate of the transparent protective substrate, the one or more piezo vibration elements thereby being disposed in the transparent protective substrate,
   wherein each of said one or more stepped portions is configured thicker than the corresponding piezo vibration element.

2. The touch panel device of claim 1, wherein at least one of the piezo vibration elements includes a plurality of piezoelectric layers and a plurality of electrode layers laminated in an alternate manner.

3. The touch panel device of claim 1, wherein at least one of the piezo vibration elements has a bimorph structure.

4. The touch panel device of claim 1, wherein each of vibrations generated by the piezo vibration elements is conveyed to the first glass substrate in a form of a surface elastic wave.

5. An electronic device, comprising a touch panel device of claim 1.

6. The touch panel device of claim 1, wherein at least one of the stepped portions is formed on the second glass substrate.

7. The touch panel device of claim 6, wherein at least one of the stepped portions is formed as a through-hole.

8. The touch panel device of claim 7, further comprising one or more buffers each disposed between one of the piezo vibration elements and the touch panel.

9. The touch panel device of claim 6, wherein the first glass substrate is configured thinner than the second glass substrate.

10. The touch panel device of claim 6, wherein the at least one of the stepped portions is formed to have a tapered wall configured such that a cross section of said at least one of the stepped portions becomes wider as approaching the first glass substrate.

* * * * *